United States Patent
Blumenthal et al.

(10) Patent No.: US 8,833,401 B2
(45) Date of Patent: Sep. 16, 2014

(54) FLUID TRANSFER ASSEMBLY

(75) Inventors: Yanir Blumenthal, Kfar Saba (IL); Eli Mandelberg, Tel Aviv (IL); Hagay Cafri, Bet-Hashmonay (IL); Haim Brudo, Kibbutz Givat Brener (IL)

(73) Assignee: HELIOFOCUS Ltd., Ness Ziona (IL)

( * ) Notice: Subject to any disclaimer, the term of this patent is extended or adjusted under 35 U.S.C. 154(b) by 92 days.

(21) Appl. No.: 13/596,077

(22) Filed: Aug. 28, 2012

(65) Prior Publication Data

US 2013/0048135 A1    Feb. 28, 2013

Related U.S. Application Data

(60) Provisional application No. 61/528,234, filed on Aug. 28, 2011.

(51) Int. Cl.
| | |
|---|---|
| *F16L 9/14* | (2006.01) |
| *F16L 9/19* | (2006.01) |
| *F16L 59/147* | (2006.01) |
| *F16L 53/00* | (2006.01) |

(52) U.S. Cl.
CPC .............. *F16L 59/147* (2013.01); *F16L 9/20* (2013.01); *F16L 53/00* (2013.01)
USPC ............................ 138/149; 138/114; 138/148

(58) Field of Classification Search
USPC .......................................... 138/114, 148, 149
See application file for complete search history.

(56) References Cited

U.S. PATENT DOCUMENTS

| | | | |
|---|---|---|---|
| 1,068,650 A | | 7/1913 | Harrison |
| 2,089,909 A | * | 8/1937 | Mansfield ............... 138/147 |
| 2,759,491 A | * | 8/1956 | Everhart ................. 285/55 |
| 3,040,760 A | | 6/1962 | Macks |
| 3,379,027 A | | 4/1968 | Mowell et al. |
| 3,830,173 A | * | 8/1974 | Hubble et al. .......... 138/114 |
| 4,164,166 A | | 8/1979 | Stubbs |
| 4,227,866 A | | 10/1980 | Stubbs |
| 4,345,743 A | * | 8/1982 | Sivilotti et al. ......... 266/44 |
| 4,535,754 A | | 8/1985 | Darr |
| 4,995,427 A | * | 2/1991 | Berchem ................ 138/155 |
| 5,797,415 A | | 8/1998 | Nicholson et al. |
| 5,896,895 A | * | 4/1999 | Simpkin ................. 138/149 |
| 5,996,643 A | * | 12/1999 | Stonitsch ................ 138/143 |
| 6,854,487 B2 | | 2/2005 | Witemyre et al. |
| 7,857,553 B2 | * | 12/2010 | Tsuchie et al. ......... 406/193 |
| 2006/0207673 A1 | | 9/2006 | O'Brien et al. |
| 2010/0018601 A1 | * | 1/2010 | Princell et al. ......... 138/149 |
| 2010/0193061 A1 | * | 8/2010 | Princell et al. ......... 138/107 |

FOREIGN PATENT DOCUMENTS

| | | |
|---|---|---|
| EP | 12037 | 6/1980 |
| JP | 10132148 A | 5/1998 |
| JP | 2007205551 A | 8/2007 |

* cited by examiner

*Primary Examiner* — Patrick F. Brinson
(74) *Attorney, Agent, or Firm* — Daniel J. Swirsky; AlphaPatent Associates Ltd.

(57) ABSTRACT

An annulus assembly including a central fluid channel for flow of a central fluid therethrough, a circumferential fluid channel surrounding the central fluid channel, and a first thermal insulation layer intermediate the central fluid channel and the circumferential fluid channel, for direct fluid contact with the central fluid.

17 Claims, 3 Drawing Sheets

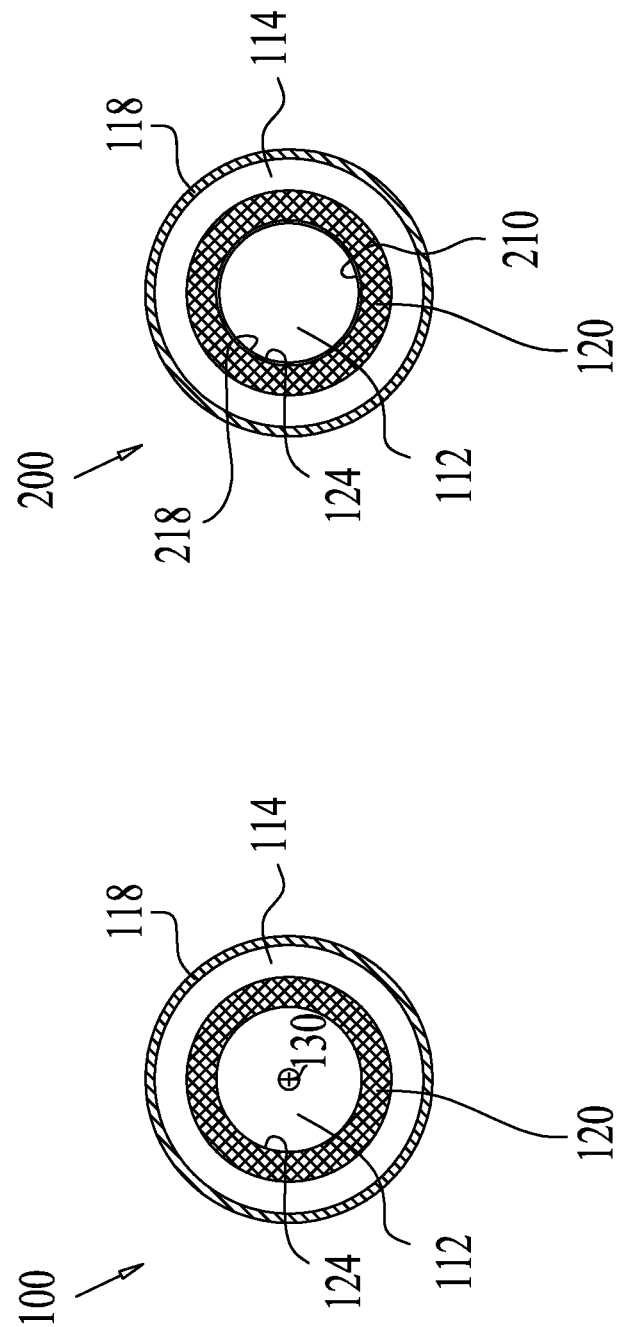

FLUID TRANSFER ASSEMBLY

CROSS REFERENCE TO RELATED APPLICATIONS

This application claims the benefit of priority of U.S. Provisional Patent Application No. 61/528,234 filed on Aug. 28, 2011 titled "Fluid Transfer Assembly", which is incorporated herein by reference in its entirety.

FIELD OF THE INVENTION

The present invention relates generally to fluid transfer assemblies and particularly to annulus assemblies.

BACKGROUND OF THE INVENTION

Fluid transfer assemblies comprise a plurality of pipes provided for flow of fluids therein.

It is known in the art that the plurality of pipes may be designed as an annulus assembly 10 comprising a central fluid channel 12, surrounded by a circumferential fluid channel 14. The central fluid channel 12 and the circumferential fluid channel 14 may be generally coaxially aligned therebetween. A thermal insulation layer 16 is typically provided intermediate the central fluid channel 12 and the circumferential fluid channel 14. A circumferential tube 18 is typically provided around the circumferential fluid channel 14. A central tube 20 is always provided around the central fluid channel 12 and is in direct fluid contact with a central fluid flowing in the central fluid channel 12. The central tube 20 is typically formed of a metallic material, such as carbon steel or stainless steel.

The central tube 20 is formed of a material comprising a relatively high coefficient of thermal expansion. Typically a coefficient of linear thermal expansion is greater than approximately $10(10^{-6}/K)$, typically measured at approximately 25 C.°. Alternatively, a coefficient of linear thermal expansion is greater than approximately $12(10^{-6}/K)$, typically measured at approximately 25 C.°. The central tube 20 thermally expands due to a relatively hot central fluid flowing through the central fluid channel 12, within the central tube 20. The central tube 20 typically thermally expands in a plurality of orientations, such as a substantially radial orientation, illustrated by arrows 30. Additionally or alternatively, the central tube 20 thermally expands in a substantially longitudinal orientation of a longitudinal axis 40 along the annulus assembly 10.

The central tube 20 is typically formed of a plurality of sections (not shown) along the longitudinal axis 40 of the annulus assembly 10. The sections are welded thereto with relative precision to ensure the substantial concentricity of the central tube 20 for maintaining the coaxial alignment between the central fluid channel 12 and the circumferential fluid channel 14.

The thermal expansion of the central tube 20 applies undesired mechanical stresses on the central tube 20.

SUMMARY OF THE INVENTION

There is thus provided in accordance with an embodiment of the invention an annulus assembly including a central fluid channel for flow of a central fluid therethrough, a circumferential fluid channel surrounding the central fluid channel, and a first thermal insulation layer intermediate the central fluid channel and the circumferential fluid channel, for direct fluid contact with the central fluid. Additionally, the first thermal insulation layer may be formed of a substantially rigid material. Moreover, the first thermal insulation layer may be formed of a material with a coefficient of linear thermal expansion less than approximately $9(10^{-6}/K)$. Alternatively, the first thermal insulation layer may be formed of a material with a coefficient of linear thermal expansion less than approximately $7(10^{-6}/K)$.

In accordance with an embodiment of the invention the annulus assembly includes a circumferential tube intermediate the circumferential fluid channel and the ambient, wherein the first thermal insulation layer may be formed of a material with a coefficient of thermal expansion less than a coefficient of thermal expansion of a material forming the circumferential tube. Additionally, the first thermal insulation layer may be formed of a material with a coefficient of thermal expansion of 80% or less than a coefficient of thermal expansion of a material forming the circumferential tube. Alternatively, the first thermal insulation layer may be formed of a material with a coefficient of thermal expansion of 50% or less than a coefficient of thermal expansion of a material forming the circumferential tube.

In accordance with an embodiment of the invention the first thermal insulation layer may be formed of a machinable material with a relatively high manufacturing precision. Additionally, a tube may be provided intermediate the central fluid channel and the circumferential fluid channel. Moreover, a second thermal insulation layer may be provided intermediate the circumferential fluid channel and the ambient.

In accordance with an embodiment of the invention a circumferential fluid flows through the circumferential fluid channel, the central fluid is hotter than the circumferential fluid and the central fluid and the circumferential fluid flow at substantially the same pressure.

There is thus provided in accordance with an embodiment of the invention an annulus assembly including a central fluid channel for a central fluid flowing therethrough, a circumferential fluid channel surrounding the central fluid channel, a first thermal insulation layer intermediate the central fluid channel and the circumferential fluid channel, and a lining intermediate the central fluid channel and the circumferential fluid channel for direct fluid contact with the central fluid, wherein the lining is formed of a material with a relatively low coefficient of thermal expansion.

In accordance with an embodiment of the invention the lining is formed with a surface roughness in a range of 0.001-0.8 microns. Additionally, the lining is formed with a thickness in a range of 1 micron-3 millimeters. Moreover, the lining is formed of a material with a coefficient of linear thermal expansion less than approximately $9(10^{-6}/K)$. Alternatively, the lining is formed of a material with a coefficient of linear thermal expansion less than approximately $7(10^{-6}/K)$. Additionally, the lining may be formed of a material with a coefficient of thermal expansion less than a coefficient of thermal expansion of a material forming the circumferential tube.

BRIEF DESCRIPTION OF THE DRAWINGS

The present invention will be understood and appreciated more fully from the following detailed description, taken in conjunction with the drawings in which:

FIG. 2 is a simplified sectional illustration of an annulus assembly according to an embodiment of the invention;

FIG. 3 is a simplified sectional illustration of an annulus assembly according to an embodiment of the invention;

DETAILED DESCRIPTION OF THE INVENTION

Figure 1:
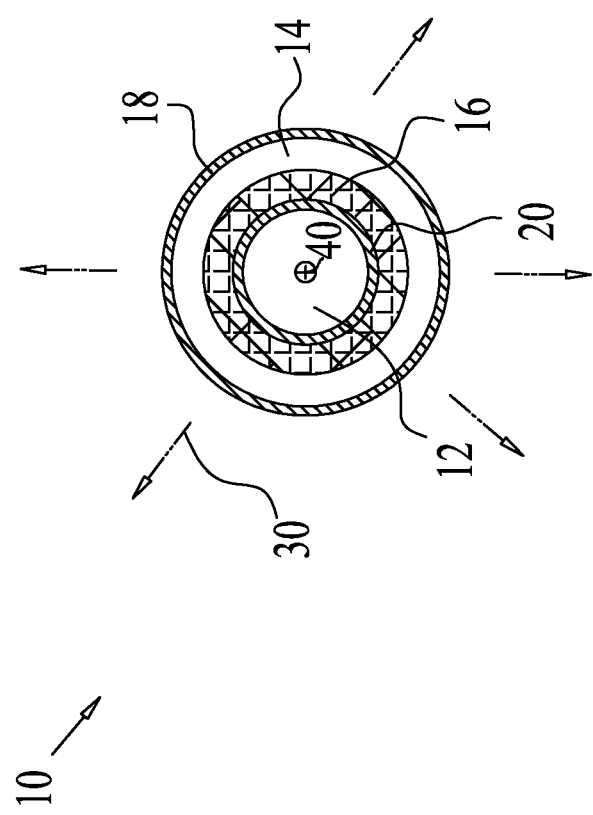
FIG. 1 is a sectional illustration of a prior art annulus assembly.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Reference is made to FIG. 2, which is a simplified sectional illustration of an annulus assembly according to an embodiment of the invention. As seen in FIG. 2, an annulus assembly 100 comprises a central fluid channel 112, surrounded by a circumferential fluid channel 114. The central fluid channel 112 and the circumferential fluid channel 114 may be generally coaxially aligned therebetween. The central fluid channel 112 is provided for flow of a central fluid therethrough. The circumferential fluid channel 114 is provided for flow of a circumferential fluid therethrough.

A circumferential tube 118 may be provided around the circumferential fluid channel 114. The circumferential tube 118 may be formed of any suitable material providing rigidity to the circumferential fluid channel 114 for allowing the central fluid to flow therethrough. Additionally, the circumferential tube 118 may be formed of any suitable material allowing relatively high temperature fluid to flow therethrough, such as in a range of 100-350 C.°, as will be further described. In a non-limiting example, the circumferential tube 118 may be formed of carbon steel.

A first thermal insulation layer 120 is provided intermediate the central fluid channel 112 and the circumferential fluid channel 114 for thermally insulating the central fluid flowing through the central fluid channel 112 and preventing heat exchange between the central fluid and the circumferential fluid.

In accordance with an embodiment, the central fluid flows in direct contact with an inner interior surface 124 of the first thermal insulation layer 120. The first thermal insulation layer 120 is configured to generally surround the central fluid channel 112 and is generally coaxially aligned with the central fluid channel 112 and the circumferential fluid channel 114.

The first thermal insulation layer 120 is formed of any suitable insulating material for thermally insulating the central fluid. Additionally, the first thermal insulation layer 120 is formed of a material with a relatively low coefficient of thermal expansion.

In a non-limiting example the relatively low coefficient of thermal expansion may be a coefficient of linear thermal expansion less than approximately $9(10^{-6}/K)$, typically measured at approximately 25 C.°. Alternatively, the relatively low coefficient of thermal expansion may be a coefficient of linear thermal expansion less than approximately $7(10^{-6}/K)$, typically measured at approximately 25 C.°.

In accordance with an embodiment, the relatively low coefficient of thermal expansion of the first thermal insulation layer 120 may be less than the coefficient of thermal expansion of a material forming the circumferential tube 118. In a non-limiting example, the relatively low coefficient of thermal expansion of the first thermal insulation layer 120 may be 80% or less than the coefficient of thermal expansion of the circumferential tube 118. In a non-limiting example, the relatively low coefficient of thermal expansion of the first thermal insulation layer 120 may be 60% or less than the coefficient of thermal expansion of the circumferential tube 118. In a non-limiting example, the relatively low coefficient of thermal expansion of the first thermal insulation layer 120 may be 50% or less than the coefficient of thermal expansion of the circumferential tube 118.

Moreover, the first thermal insulation layer 120 is formed of a material that provides substantial rigidity to the interior surface 124 of the first thermal insulation layer 120 for allowing the central fluid to flow therethrough.

Furthermore, the first thermal insulation layer 120 may be formed of a generally non-corrosive material withstanding flow of the central fluid with a relatively high temperature, as will be further described.

In accordance with some embodiments, the first thermal insulation layer 120 may be formed of a machinable material that allows manufacturing the first thermal insulation layer 120 at relatively high precision. The relatively high precision manufacturing of the first thermal insulation layer 120 may be preformed to ensure that the central fluid channel 112 is substantially coaxially aligned with the circumferential fluid channel 114. Additionally, the relatively high precision manufacturing of the first thermal insulation layer 120 may be preformed to allow forming the interior surface 124 with a relatively smooth surface so as to minimize turbulent flow of the central fluid therethrough. In a non-limiting example, the relative high manufacturing precision may be in the range of single microns to 10 millimeters.

In a non-limiting example, the first thermal insulation layer 120 may be formed of any suitable ceramic with thermal insulation properties and/or rigid or machinable properties, such as alumina, silica or a combination thereof; a rigid or machinable microporous insulation material, such as the commercially available MICROTHERM® Machined Product or the MICROTHERM® MPS insulation from Microtherm N.V. of Industriepark-Noord 1, 9100 Sint-Niklaas, Belgium.

As described hereinabove, the central fluid channel 112 is defined by the first thermal insulation layer 120. The central fluid flowing therethrough flows in direct contact with the interior surface 124 of the first thermal insulation layer 120. This may be advantageous since the thermal insulation layer 120 typically is formed with a relatively low coefficient of thermal expansion and thus does not expand in heat and therefore does not apply undesired mechanical stresses on the annulus assembly 100. Additionally, forming the central fluid channel 112 by the thermal insulation layer 120 utilizes the requisite first thermal insulation layer 120 without adding additional tubing, such as central tube 20 (FIG. 1). Moreover, by forming the central fluid channel 112 using the first thermal insulation layer 120, the requirement for relatively precise welding of a central tube 20 is eliminated.

It is noted in reference to FIGS. 2-5, in a non-limiting example, the annulus assembly may be provided to deliver a central fluid flowing through the central fluid channel 112 at a relatively high temperature and a circumferential fluid flowing through the circumferential fluid channel 114 at a temperature lower than the central fluid temperature. For example, the central fluid may have a temperature in a range of approximately 400-1000° C., or in a range of approximately 400-600° C. The circumferential fluid may have a temperature in a range of approximately 25-350° C. or in a range of approximately 100-350° C.

Generally, the central fluid has substantially the same pressure (or with a small pressure difference) as the circumferential fluid. Thus, the central fluid is generally not propelled to escape to the circumferential fluid channel 114. Similarly, the circumferential fluid is generally not propelled to flow to the central fluid channel 112 or to the ambient, i.e. the environment out of the annulus assembly 100. Therefore there is relatively minimal pressure applied by the central fluid on the interior surface 124 of the first thermal insulation layer 120.

The central fluid and the circumferential fluid of FIGS. 2-5 may comprise any suitable fluid, such as a gas, typically air, helium or carbon dioxide; or a liquid such as oil, water, an organic fluid or molten salt, for example. It is noted that the central fluid may be the same or different than the circumferential fluid.

Reference is made to FIG. 3, which is a simplified sectional illustration of an annulus assembly according to an embodiment of the invention. As seen in FIG. 3, an annulus assembly 200 is substantially similar to annulus assembly 100 of FIG. 2. A lining 210 is provided intermediate the central fluid channel 112 and the circumferential fluid channel 114. The lining 210 may be in direct fluid contact with the central fluid on an interior surface 218 of the lining 210.

The lining 210 may be provided for allowing the central fluid to flow with relatively little turbulence through the central fluid channel 112. The lining 210 may be formed on the interior surface 218 with a relatively smooth surface comprising a surface roughness which allows the central fluid to flow through the central fluid channel 112 with relatively little turbulence. For example, the surface roughness of the interior surface 218 of the lining 210 may be in the range of 0.001-0.8 microns.

In accordance with the embodiment of FIG. 3, the interior surface 124 of the first thermal insulation layer 120 of the annulus assembly 200 needs not be formed with a relatively smooth surface, since the lining 210 provides a smooth surface for flow of the central fluid in direct contact with the lining 210 with relatively little turbulence.

The lining 210 may be configured substantially as a tube and may thus underlie the interior surface 124 of the first thermal insulating layer 120, as seen in FIG. 3. Alternatively, the lining 210 may be formed as strips (not shown) or any other suitable configuration and provided at portions of the interior surface 124 of the first thermal insulation layer 120.

The lining 210 may be formed with a relatively small thickness, such as in the range of 1 micron-3 millimeters, or a range of 1-50 microns.

The lining 210 is formed of a material with a relatively low coefficient of thermal expansion.

In a non-limiting example the relatively low coefficient of thermal expansion may be a coefficient of linear thermal expansion less than approximately $9(10^{-6}/K)$, typically measured at approximately 25 C.°. Alternatively, the relatively low coefficient of thermal expansion may be a coefficient of linear thermal expansion less than approximately $7(10^{-6}/K)$, typically measured at approximately 25 C.°.

In accordance with an embodiment, the relatively low coefficient of thermal expansion of the lining 210 may be less than the coefficient of thermal expansion of the circumferential tube 118. In a non-limiting example, the relatively low coefficient of thermal expansion of the lining 210 may be 80% or less than the coefficient of thermal expansion of the circumferential tube 118. In a non-limiting example, the relatively low coefficient of thermal expansion of the lining 210 may be 60% or less than the coefficient of thermal expansion of the circumferential tube 118. In a non-limiting example, the relatively low coefficient of thermal expansion of the lining 210 may be 50% or less than the coefficient of thermal expansion of the circumferential tube 118.

The lining 210 may be formed of a rigid material or a flexible material.

The lining 210 may be formed of a generally non-corrosive material designed for withstanding the flow of the central fluid with a relatively high temperature.

As described, the lining may be formed of any suitable material with a relatively low coefficient of thermal expansion and a surface roughness which allows the central fluid to flow through the central fluid channel 112 with relatively little turbulence. In a non-limiting example, the lining 210 may be formed of glass, silica, silicon carbide or a combination thereof.

Figure 4:
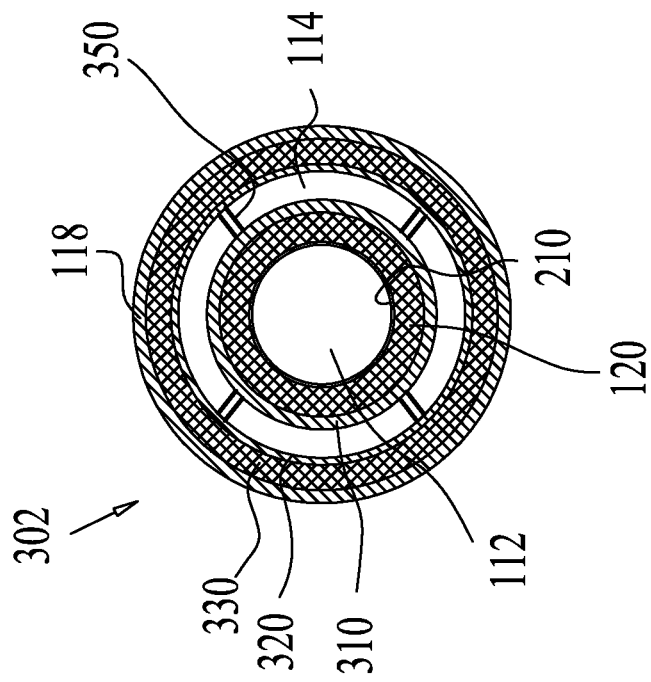
FIG. 4 is a simplified sectional illustration of an annulus assembly according to an embodiment of the invention.
Figure 5:
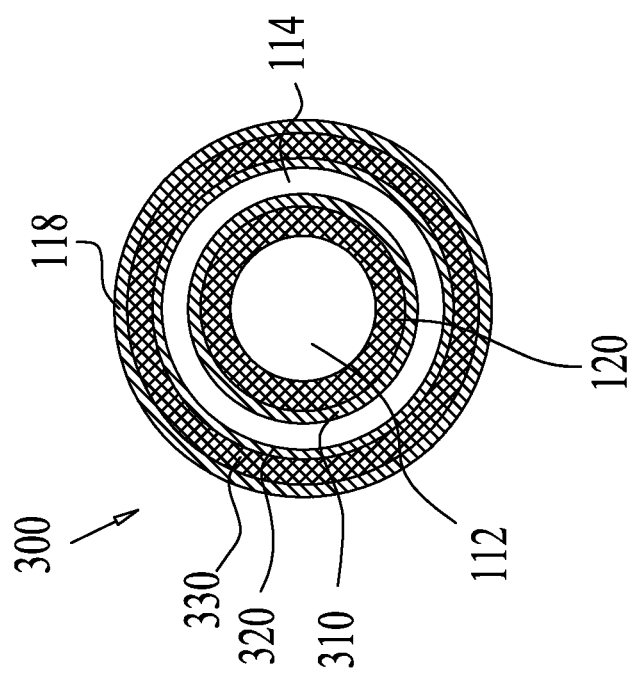
FIG. 5 is a simplified sectional illustration of an annulus assembly according to an embodiment of the invention.

Reference is made to FIGS. 4 and 5, which are each a simplified sectional illustration of an annulus assembly according to an embodiment of the invention. As seen in FIG. 4, an annulus assembly 300 is substantially similar to annulus assembly 100 of FIG. 2. As seen in FIG. 5, an annulus assembly 302 is substantially similar to annulus assembly 200 of FIG. 3. In FIGS. 4 and 5 the annulus assemblies 300 and 302 may comprise any one of the additional following components, as will be described. As seen in FIGS. 4 and 5, a tube 310 and/or a tube 320 may be provided intermediate the central fluid channel 112 and the circumferential fluid channel 114. The tube 310 may be an interior tube 310 positioned around the first thermal insulation layer 120. The tube 320 may be an exterior tube 320 surrounding the circumferential fluid channel 114. Wherein both the interior tube 310 and exterior tube 320 are provided, the interior tube 310 and exterior tube 320 may be formed to be coaxially aligned therebetween. Each of the interior tube 310 or exterior tube 320 may be coaxially aligned with the central fluid channel 112 and the circumferential fluid channel 114.

The interior tube 310 and exterior tube 320 may be formed of any suitable material able to withstand relatively high temperatures of the circumferential fluid. For example, the interior tube 310 and exterior tube 320 may be formed of a ceramic material, silicon carbide, stainless steel, carbon steel or any combination of any suitable material.

The interior tube 310 and/or the exterior tube 320 may be replaced by a lining (not shown) with a relatively small thickness, such as in the range of 50 microns to 2 millimeters.

As described hereinabove, the central fluid flowing through the fluid channel 112 has substantially the same pressure (or with a small pressure difference) as the circumferential fluid flowing through the circumferential fluid channel 114. Therefore, the central fluid is generally not propelled to escape to the circumferential fluid channel 114 and similarly, the circumferential fluid is generally not propelled to flow to the central fluid channel 112 or to the ambient. Thus there is relatively minimal pressure applied on the interior tube 310 and/or the exterior tube 320 by the central fluid or the circumferential fluid.

A second thermal insulation layer 330 may be provided to insulate the circumferential fluid and also the central fluid from the ambient. The second thermal insulation layer 330 may underlie the circumferential tube 118. The second thermal insulation layer 330 may be formed of any suitable insulating material.

In accordance with an embodiment, the second thermal insulation layer 330 may be formed of a relatively rigid material, such as wherein the exterior tube 320 is obviated. Alternatively, the second thermal insulation layer 330 may be formed of a flexible material, such as glass wool, such as wherein the exterior tube 320 is provided.

The circumferential tube 118 in the embodiments of FIGS. 4 and 5 is provided to enclose the respective annulus assemblies 300 and 302.

In any one of the embodiments of FIGS. 2-5 the coaxial alignment between the central fluid channel 112 and the circumferential fluid channel 114 may be facilitated in any suitable manner. For example, aligners 350, as shown in FIG. 5, may be provided between the central fluid channel 112 and the circumferential fluid channel 114. The aligners may be provided in any one of the embodiments of FIGS. 2-5.

It will be appreciated by persons skilled in the art that the present invention is not limited by what has been particularly shown and described herein above. Rather the scope of the present invention includes both combinations and subcombinations of the various features described hereinabove as well as variations and modifications which would occur to persons skilled in the art upon reading the specifications and which are not in the prior art.

What is claimed is:

1. An annulus assembly comprising:
   a central fluid channel for flow of a central fluid therethrough;
   a circumferential fluid channel surrounding said central fluid channel; and
   a first thermal insulation layer intermediate said central fluid channel and said circumferential fluid channel, for direct fluid contact with said central fluid,
   wherein a second thermal insulation layer is provided intermediate said circumferential fluid channel and the ambient.

2. An annulus assembly comprising:
   a central fluid channel for flow of a central fluid therethrough;
   a circumferential fluid channel surrounding said central fluid channel; and
   a first thermal insulation layer intermediate said central fluid channel and said circumferential fluid channel, for direct fluid contact with said central fluid,
   wherein a circumferential fluid flows through said circumferential fluid channel,
   said central fluid being hotter than said circumferential fluid, and said central fluid and said circumferential fluid flowing at substantially the same pressure.

3. An annulus assembly comprising:
   a central fluid channel for a central fluid flowing therethrough;
   a circumferential fluid channel surrounding said central fluid channel;
   a first thermal insulation layer intermediate said central fluid channel and said circumferential fluid channel; and
   a lining intermediate said central fluid channel and said circumferential fluid channel for direct fluid contact with the central fluid, wherein said lining is formed of a material with a relatively low coefficient of thermal expansion.

4. An annulus assembly according to claim 3 wherein said first thermal insulation layer is formed of a substantially rigid material.

5. An annulus assembly according to claim 3 wherein said first thermal insulation layer is formed of a material with a coefficient of linear thermal expansion less than approximately $9(10^{-6}/K)$.

6. An annulus assembly according to claim 3 wherein said first thermal insulation layer is formed of a material with a coefficient of linear thermal expansion less than approximately $7(10^{-6}/K)$.

7. An annulus assembly according to claim 3 and comprising a circumferential tube intermediate said circumferential fluid channel and the ambient, wherein said first thermal insulation layer is formed of a material with a coefficient of thermal expansion less than a coefficient of thermal expansion of a material forming said circumferential tube.

8. An annulus assembly according to claim 3 and comprising a circumferential tube intermediate said circumferential fluid channel and the ambient, wherein said first thermal insulation layer is formed of a material with a coefficient of thermal expansion of 80% or less than a coefficient of thermal expansion of a material forming said circumferential tube.

9. An annulus assembly according to claim 3 and comprising a circumferential tube intermediate said circumferential fluid channel and the ambient, wherein said first thermal insulation layer is formed of a material with a coefficient of thermal expansion of 50% or less than a coefficient of thermal expansion of a material forming said circumferential tube.

10. An annulus assembly according to claim 3 wherein a tube is provided intermediate said central fluid channel and said circumferential fluid channel.

11. An annulus assembly according to claim 3 wherein a second thermal insulation layer is provided intermediate said circumferential fluid channel and the ambient.

12. An annulus assembly according to claim 3, wherein a circumferential fluid flows through said circumferential fluid channel,
    said central fluid being hotter than said circumferential fluid, and said central fluid and said circumferential fluid flowing at substantially the same pressure.

13. An annulus assembly according to claim 3 wherein said lining is formed with a surface roughness in a range of 0.001-0.8 microns.

14. An annulus assembly according to claim 3 wherein said lining is formed with a thickness in a range of 1 micron -3 millimeters.

15. An annulus assembly according to claim 3 wherein said lining is formed of a material with a coefficient of linear thermal expansion less than approximately $9(10^{-6}/K)$.

16. An annulus assembly according to claim 3 wherein said lining is formed of a material with a coefficient of linear thermal expansion less than approximately $7(10^{-6}/K)$.

17. An annulus assembly according to claim 3 and comprising a circumferential tube intermediate said circumferential fluid channel and the ambient, wherein said lining is formed of a material with a coefficient of thermal expansion less than a coefficient of thermal expansion of a material forming said circumferential tube.

* * * * *